United States Patent
Hernandez et al.

(10) Patent No.: US 6,760,592 B2
(45) Date of Patent: Jul. 6, 2004

(54) SYSTEM AND METHOD FOR CYCLIC CARRIER DE-ROTATION FOR EARLIEST TIME OF ARRIVAL ESTIMATION IN A WIRELESS COMMUNICATIONS SYSTEM

(75) Inventors: David Hernandez, Smithtown, NY (US); David Goren, Smithtown, NY (US); Benjamin Bekritsky, New York, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/338,621

(22) Filed: Jan. 7, 2003

(65) Prior Publication Data

US 2003/0143975 A1 Jul. 31, 2003

Related U.S. Application Data
(60) Provisional application No. 60/346,459, filed on Jan. 7, 2002, and provisional application No. 60/373,296, filed on Apr. 18, 2002.

(51) Int. Cl.[7] .............................................. H04Q 7/20
(52) U.S. Cl. ............................. 455/456.1; 455/456.1; 375/316; 342/457
(58) Field of Search .......................... 455/456.1, 456.5, 455/456.6, 504, 506, 65; 375/316, 322, 340, 343, 371; 342/457, 463, 464, 465

(56) References Cited

U.S. PATENT DOCUMENTS

| | | | |
|---|---|---|---|
| 5,568,513 A | 10/1996 | Croft et al. | 375/224 |
| 5,701,329 A | 12/1997 | Croft et al. | 375/224 |
| 5,740,200 A | 4/1998 | Kamata | 375/224 |
| 6,233,273 B1 | 5/2001 | Webster et al. | 375/148 |
| 6,469,665 B2 * | 10/2002 | Porcino | 342/387 |
| 2002/0155845 A1 * | 10/2002 | Martorana | 455/456 |
| 2003/0156672 A1 * | 8/2003 | O'Shea et al. | 375/365 |

OTHER PUBLICATIONS

Ertel, R.B.; Reed, J.H.; Selected Areas in Communications, IEEE Journal on, vol.: 17 Issue: 11, Nov. 1999, pp.: 1829–1840*

Weinberg, A.; The Effects of Repeater Hard–Limiting, Filter Distortion, and Noise on a Pseudo–Noise, Time–Of–Arrival Estimation System; Communications, IEEE Transactions on [legacy, pre—1988], vol.: 27 Issue: 9, Sep. 1979, pp.: 1271–1279.*

"Spread Spectrum Indoor GElocation" by Benjamin B.Peterson et al., *Navigation Journal of the Institute of Navigation*, vol. 45, No. 2 Summer 1998.

U.S. patent application Ser. No. 10/242,363 by David Hernandez and David Green; filed Sep. 13, 2002; Pending.

* cited by examiner

*Primary Examiner*—Lee Nguyen
*Assistant Examiner*—Un C Cho
(74) *Attorney, Agent, or Firm*—Baker Botts L.L.P.

(57) ABSTRACT

The present invention relates generally to a system and method for determining the earliest time of arrival of a received signal in a wireless communications system. In particular, the present invention relates to a system and method for de-rotation of the carrier phase of a received signal to offset the effects of combining a received line-of-sight signal with various received multipath artifacts that may shift the complex phase of the received signal. The system and method of the present invention can improve the accuracy of the estimated time of arrival of a received signal by computing the time of arrival of the received signal at numerous different phase references and identifying the earliest of the computed times of arrival.

24 Claims, 6 Drawing Sheets

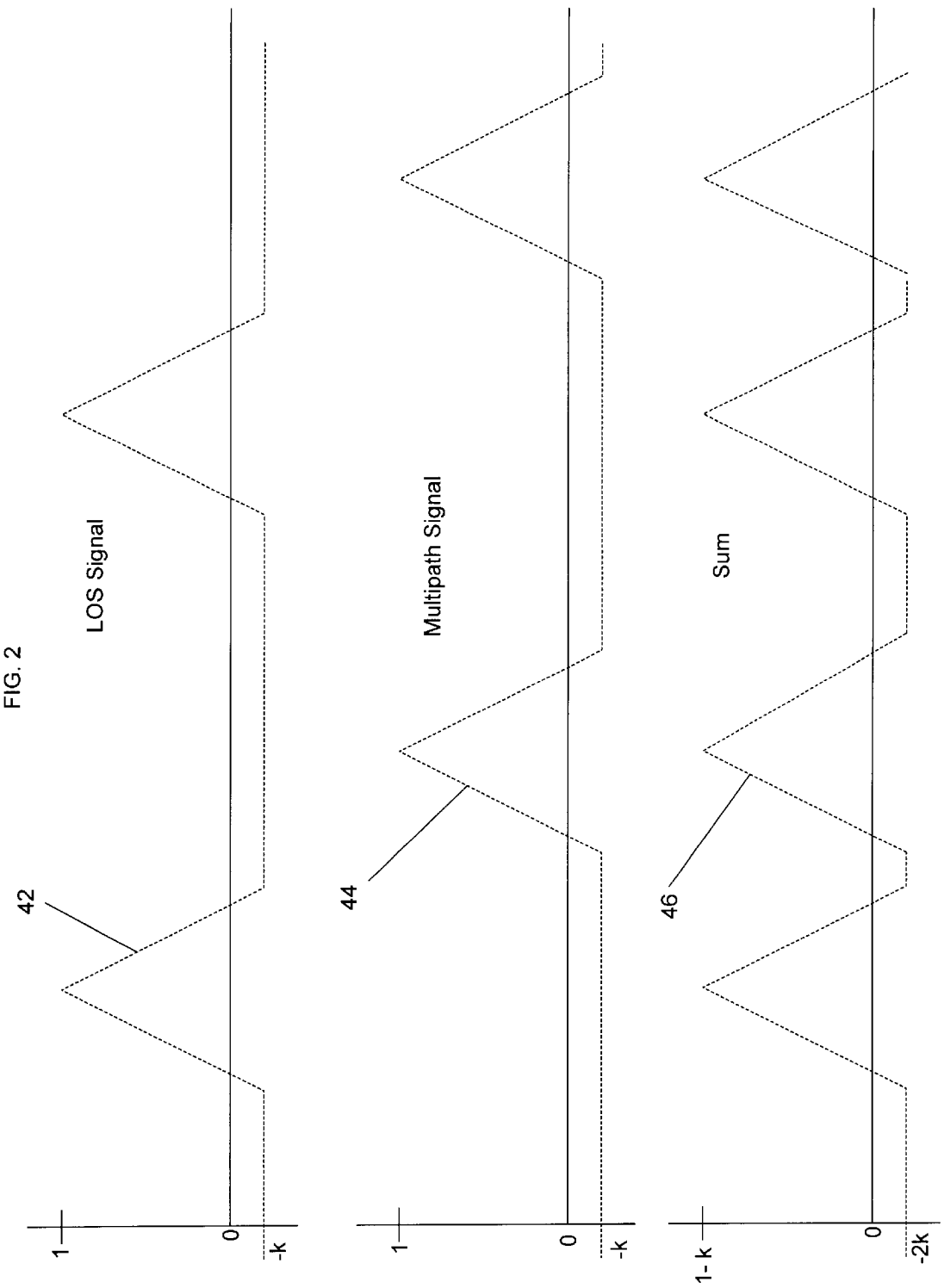

SYSTEM AND METHOD FOR CYCLIC CARRIER DE-ROTATION FOR EARLIEST TIME OF ARRIVAL ESTIMATION IN A WIRELESS COMMUNICATIONS SYSTEM

PRIORITY CLAIM

This application claims the benefit of the filing dates of Provisional Applications Nos. 60/346,459, filed Jan. 7, 2002, and 60/373,296, filed Apr. 18, 2002, both assigned to the same assignee as the present invention.

FIELD OF THE INVENTION

The invention relates generally to pulse time of arrival location methods and systems. More particularly, the invention is directed to a system and method for estimation of the time of arrival of a received signal in a wireless communications system, utilizing cyclic carrier de-rotation and amplitude-offset invariant template detection for pulse position estimation to determine the earliest time of arrival of a line-of-sight signal among a plurality of signals which may include the line of sight signal and one or more multipath signals.

BACKGROUND OF THE INVENTION

The operation of many discrete systems is based on analysis of a signal in order to find the existence and position in time of a particular signal with a predetermined shape. Laser-scanner decoding, mobile ranging, real-time location, and digital signal processing for feature extraction all may be based on deriving knowledge concerning the time of arrival of one or more signals of predetermined characteristic and duration. This type of analysis can be useful in any application where an output or intermediate stage is designed to produce an amplitude-varying signal whose "pulses" correspond to particular events of importance. Determination of the position of these pulses may be accomplished by a variety of methods, including comparison of the amplitude to some set threshold and the novel approach presented in "Spread Spectrum Indoor Geolocation," by B. Peterson et al., published in the Journal of the Institute of Navigation, Vol. 45, No. 2, Summer 1998, incorporated herein in its entirety by reference. (Reference I). In geolocation systems, pulse position detection can be used to determine the time of arrival of a transmitted signal at different receiver locations. Based on the time of arrival of the signal at these receiver locations, triangulation algorithms can be used to estimate the location of the transmitter.

The accuracy of many pulse-position detection systems, however, may become suspect in the presence of multipath impairments (i.e., the combination of random, multiple time-shifted versions of the transmitted signal along with the direct line-of-sight received signal). Because multiple versions of the transmitted signal may be randomly interspersed on the communications channel, it may become considerably more difficult to apply a template detection system to identify the existence and position in time of a particular received signal.

U.S. patent application Ser. No. 10/242,363 provides a method for amplitude-offset invariant template detection for pulse position estimation which resolves many of the difficulties encountered by template detection systems with respect to amplitude variations which may occur in a multipath environment. However, this related application of a method of amplitude-offset invariant template cross correlation, when applied to communications systems for time of arrival estimation, requires that the carriers of the received line-of-sight and multipath signals be perfectly aligned in phase with each other so that the sum of the two transmitted signals would result in a receiver output equivalent to a linear combination of the two individual receiver outputs. The system and method of the present invention takes the templating procedure (and other time of arrival estimation algorithms which rely on this assumption) a step further, applying it to the case of time of arrival estimation in communications systems, where, because of differences in the carrier phases of the various multipath and line-of-sight signal components, important timing information may be corrupted or lost. In these applications, multipath signal components may dominate over line-of-sight components, and the templating procedure cannot be guaranteed to yield the optimal time of arrival estimate due to the random variations in phase of the received signal. Subsequent processing may be needed to extract the true earliest time-of-arrival of the received signal.

SUMMARY OF THE INVENTION

Accordingly, a need has arisen for a pulse detection system which can compensate for random phase shifts that may be introduced into a signal transmitted in a multipath environment by de-rotating the carrier phase before applying a time-of-arrival estimation algorithm. In this way, the phase of the received signal may be shifted by some angle to isolate the component in the signal with the least multipath effect, thereby better isolating the line-of-sight signal and improving the time-of-arrival estimate. The present invention accordingly provides an efficient system and method for accurately identifying the earliest time of arrival of a received signal.

In a first embodiment of a system and method according to the present invention for estimating the earliest time of arrival of a received signal, a complex vector having a first phase reference can be formed by combining one or more in-phase and quadrature components of a received signal, computing the time of arrival of the received signal, varying the phase reference of the received signal one or more times to compute additional time of arrival estimates based on derivative complex vectors, and then comparing the time of arrival estimates to determine the true earliest time of arrival of the receives signal.

A next embodiment of a system according to the present invention for estimating the earliest time of arrival of a received signal may comprise a receiver, an analog-to-digital converter, apparatus for combining the in-phase and quadrature components of a received signal into a complex vector, apparatus for shifting the phase of the received signal, apparatus for computing the time of arrival of the received signal, and at least one comparing apparatus for comparing one or more computed times of arrival to determine the true earliest time of arrival of the receives signal.

BRIEF DESCRIPTION OF THE DRAWINGS

The invention will be further understood from the following detailed description of a preferred embodiment taken in conjunction with an appended drawing, in which:

FIG. 2 is a representation of multipath channel effects on a DS signal showing an original correlation output for a Line-of-Sight (LOS) signal, time-shifted multipath arrival, and the direct sum of these two signals;

DETAILED DESCRIPTION

Figure 1:
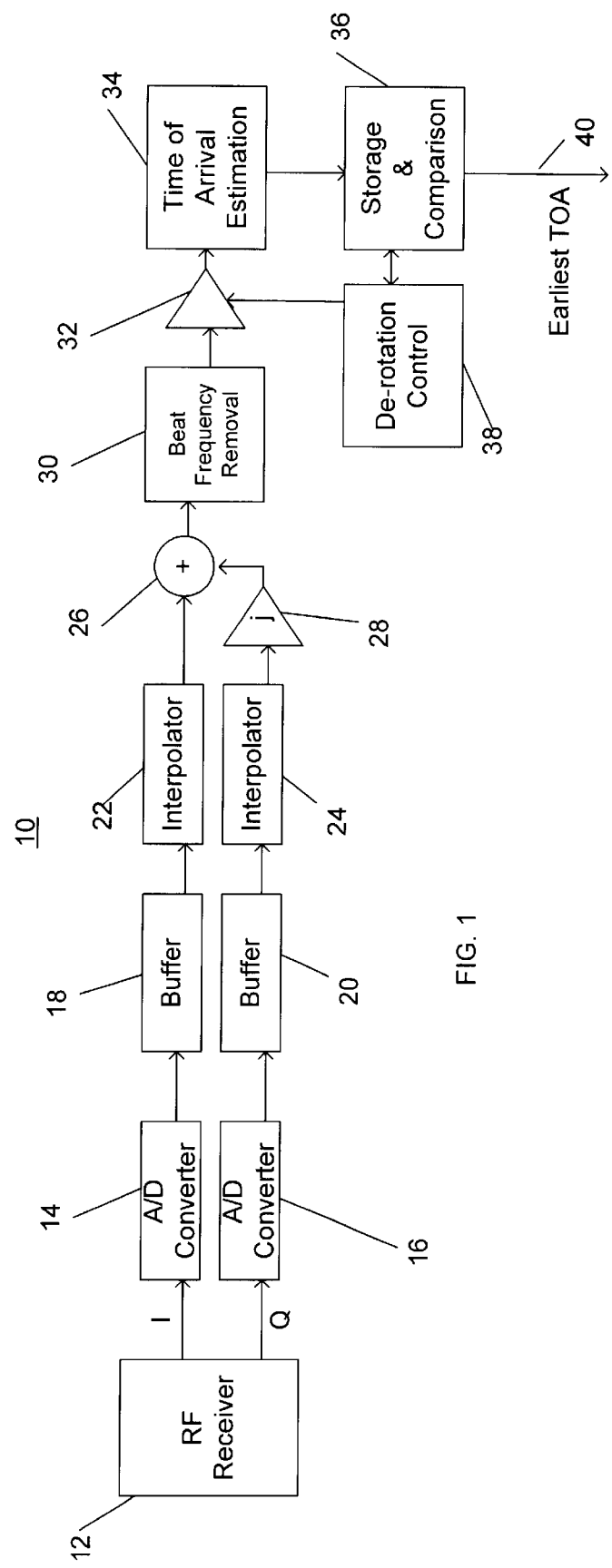
FIG. 1 is a system diagram for cyclic carrier de-rotation for earliest time of arrival estimation incorporating the principles of the present invention.

In an exemplary embodiment of a system according to the present invention depicted in FIG. 1, a radio-frequency (RF) receiver 12 may receive quadrature-modulated signals by the mechanism defined for the particular communication/modulation technique employed. In the case where one of the quadrature channels is not meant to carry information (i.e. 802.11x, 1 mbps specification), the two channels may still be demodulated, regardless, since practical demodulation is imperfect and can result in the spreading of information from one channel to another. Further, the system may include one or more analog-to-digital (A/D) converters 14 and 16 which may convert one or more received analog signals into representative digital samples. As shown in FIG. 1, A/D converter 14 may be used to convert the in-phase components of the received signal, and A/D converter 16 may be used to convert the quadrature components. This conversion is preferably performed at an appropriately high sampling rate such that the information in the analog signals is as fully represented by the samples as possible. The incoming data may be buffered in buffers 18 and 20 into an appropriately long stream such that time of arrival (TOA) determinations may be made. Typically, the autocorrelation function of the incoming signal determines the buffer size (buffer enough data to represent a "peak" in the autocorrelation), but this need not be the case. The requirements of the particular TOA algorithm, the desire to average over multiple estimates, etc. can be determining factors as well. Further, a circuit may be implemented to ensure that the mean of the signal samples (DC level) is removed so that interpolation may be performed.

Interpolators 22 and 24 may then be used to interpolate the digital signal. The degree of interpolation may depend on the sampling rate of the A/D converters, the capabilities of the TOA algorithm, the desired TOA resolution, and other factors. In some cases, no interpolation may be necessary. Since TOA algorithms generally rely on some form of correlation, the number of available signal samples per unit time usually has a direct effect on TOA estimation accuracy and resolution limits.

A combining element 26 may then be used to combine of the I and Q channel samples into single, complex samples to allow for a convenient mathematical representation/implementation of phase rotation.

A beat frequency removal component 30 and/or carrier offset compensator 32 may be implemented either in the analog portion of the system or in the digital portion (or not at all, though this may contribute inaccuracy). In the exemplary embodiment of the present invention of FIG. 1, these components 30 and 32 are implemented in the digital portion of the system.

Multiplication by a complex de-rotation factor may allow for greater TOA accuracy in the presence of signals where multipath and LOS components have an arbitrary time delay (and, hence, phase difference) between them, and there is no way to distinguish which of the two components the system has "locked on" to. The de-rotation control system 38 may provide offsets of multiple pre-selected phase angles in an attempt to locate the earliest TOA. However, numerous different methods may be used for computing or selecting the best phase-shifts in order to determine the most accurate earliest TOA in the most efficient manner.

The TOA algorithm may be implemented in a circuit or software 34, and can be performed by any of a number of techniques, including—direct correlation to the baseband transmitted signal, the amplitude-offset invariant method given in Provisional Application Serial No. 60/346,713 (assigned to the same assignee of the present application, and incorporated herein by reference), a minimum-mean-square error-based algorithm, etc. Simply put, the TOA algorithm accepts complex signal samples and calculates the single, most-likely TOA of our transmitted signal. Storage and comparison element 36 may then be used to store multiple TOA estimates and compare to determine which is the earliest TOA 40.

While FIG. 1 depicts the use of a single component, the TOA estimations may be calculated more rapidly with additional hardware. In such an implementation, rather than performing multiple de-rotations serially, they may be performed by multiple sets of hardware elements 32 and 34 arranged in parallel (each representing a single de-rotation and its corresponding TOA).

Further, a "time stamp" may be used as a point of reference. The time stamp may be calculated based on the relative time of the first analog-to-digital conversion, and may be used in conjunction with the TOA estimate in order to calculate the time of arrival with respect to some predetermined reference time. This reference may be internal (giving relative times between arrivals to the single receiver) or may be external in the case where the arrival time with respect to some external occurrence is of interest.

The templating algorithm, as described above, can be used for time of arrival estimation (TOA) for communication systems. Assuming that a received signal contains a combination of line-of-sight and multipath arrivals, it is often necessary to discern between the two. For example, referring to FIG. 2, in the case of binary phase-shift-keyed, direct sequence (DS) signals, where the received signal takes the form of correlation "peaks", transmission of a signal 42 through a multipath environment can result in multipath signal 44 being received in combination with the LOS signal 42, combining to produce a signal 46.

Figure 4:
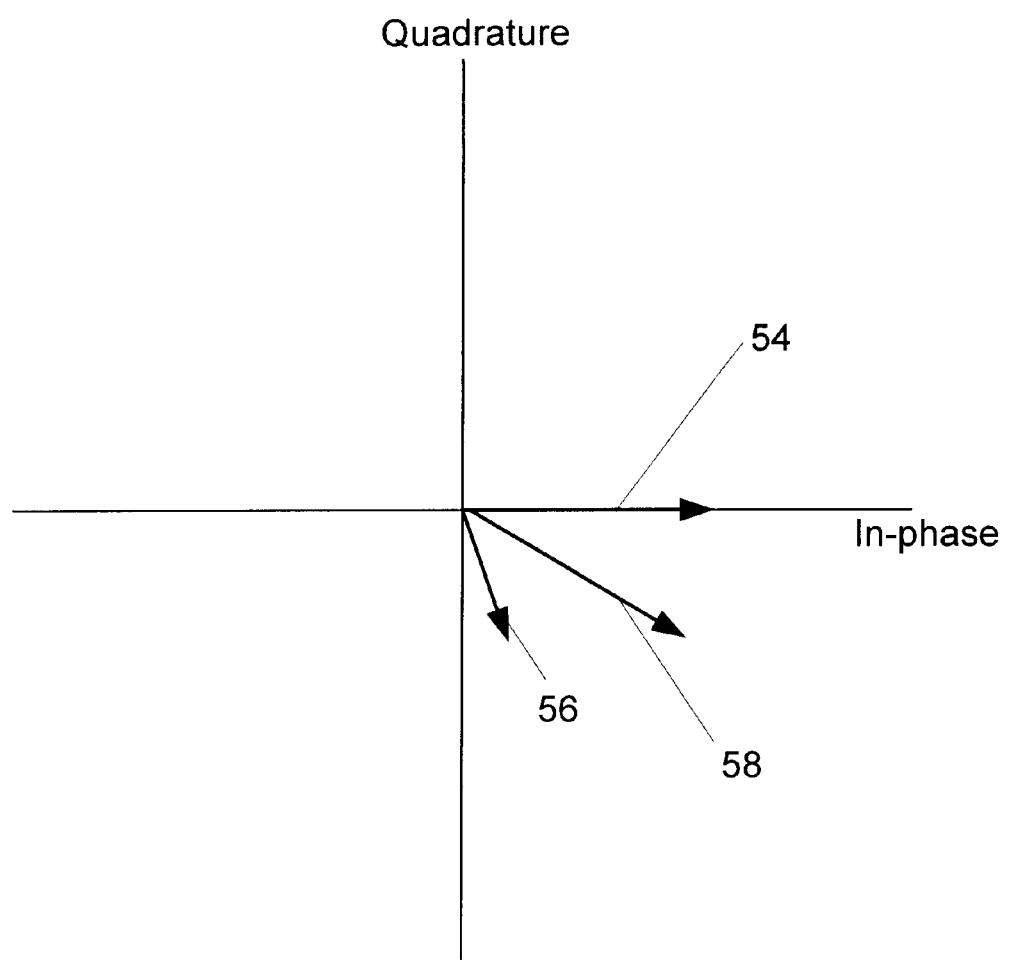
FIG. 4 is a vector diagram of enhanced rotation of the vector sum of BPSK LOS and multipath components according to an exemplary embodiment of the present invention.
Figure 5:
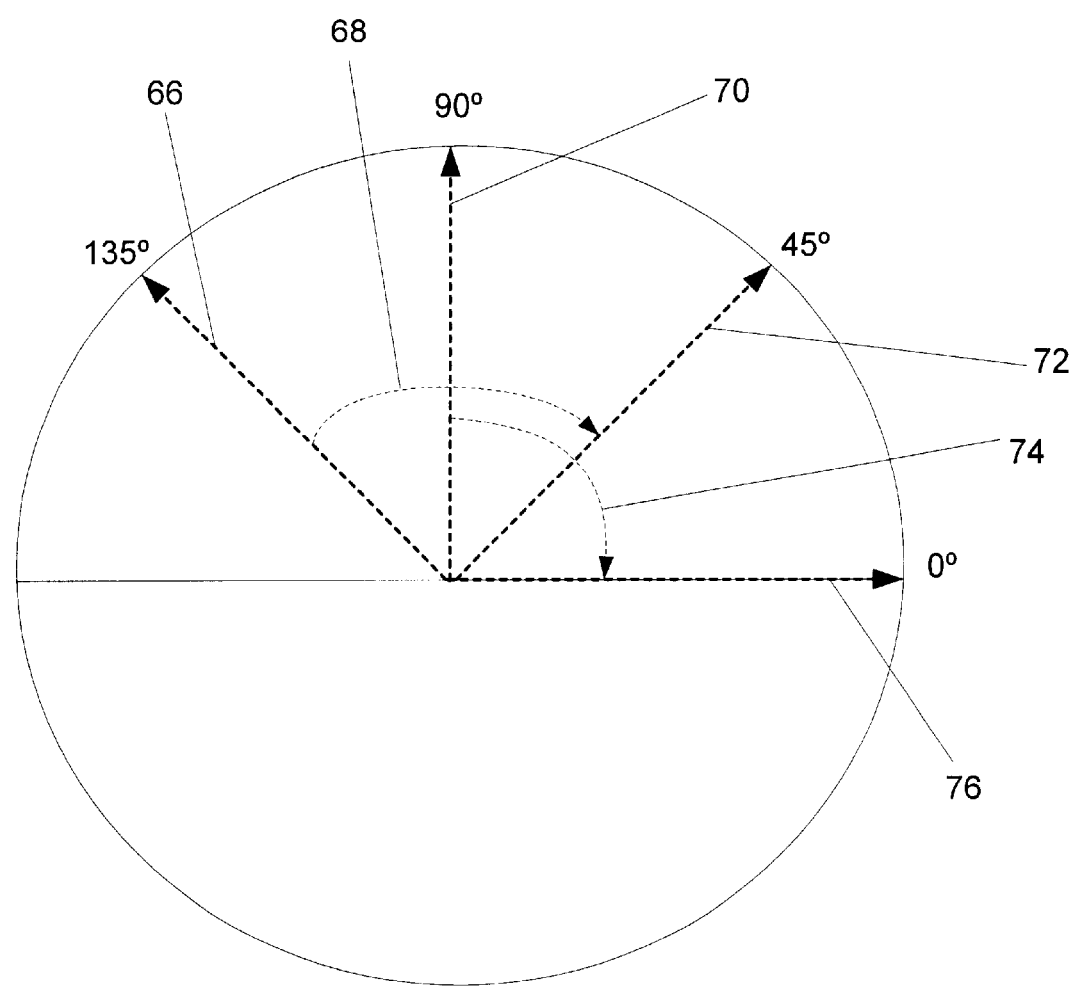
FIG. 5 is a representation of the two de-rotation angles used in an exemplary embodiment of the present invention.

In radios optimized for data communications, the receivers are designed to lock onto the strongest signal. For example, in a BPSK system, the complex phase between the local oscillator and the incoming signal are rotated until the signal has achieved a maximum on the I-channel. Though dealing with a BPSK transmitted signal, the receiver may actually be considered to receive data from a complex plane as a result of multipath and other effects. Accordingly, amplitude modulations and phase-rotations in the received signal may be represented using a vector notation on a Cartesian plane as shown in FIGS. 3–5 (with I and Q channels represented by the horizontal and vertical axes, respectively).

Figure 3A:
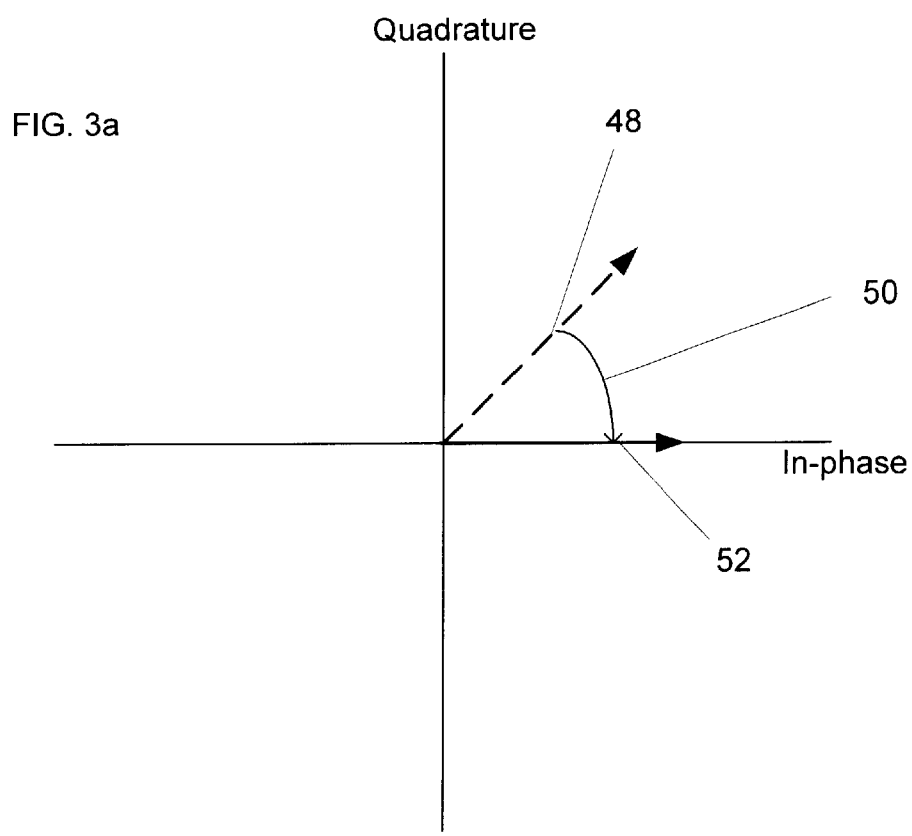
FIG. 3A is a vector diagram showing rotation of a BPSK (binary phase shift keyed) LOS signal in a standard BPSK system.
Figure 3B:
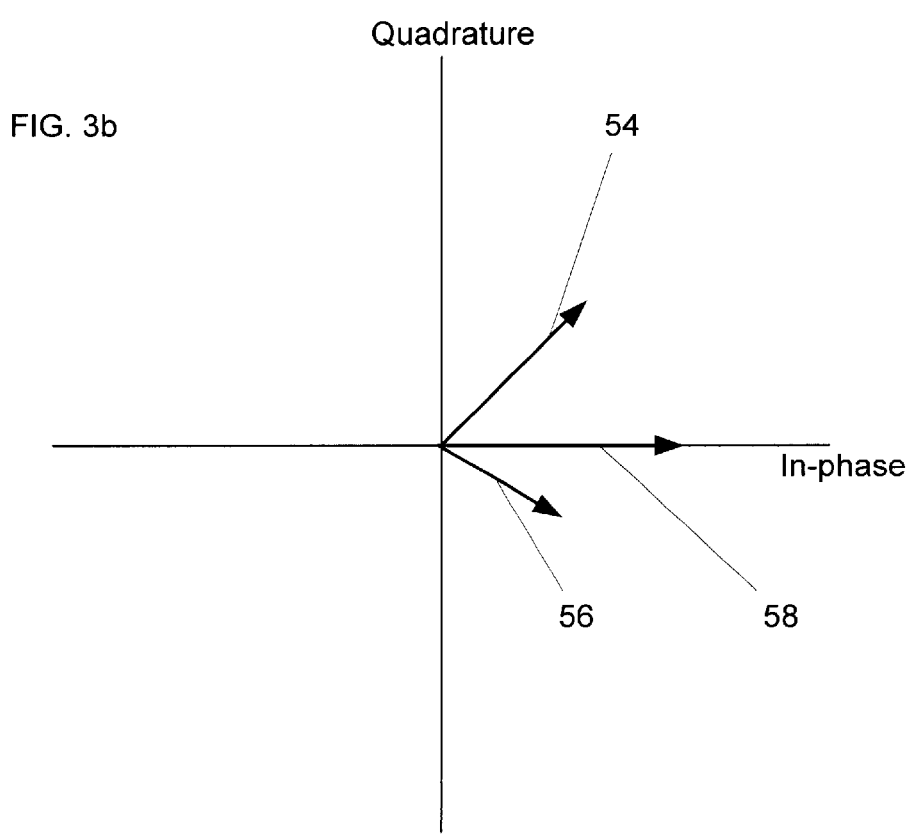
FIG. 3B s a vector diagram of the vector sum of the BPSK LOS and multipath components in a standard BPSK system.

FIGS. 3a and 3b show the rotation of a received signal that is performed by standard BPSK receiver systems.

Referring to FIG. 3a, under ideal transmission channel conditions, a BPSK DS receiver may deal exclusively with binary data transmitted via a signal 52 on the in-phase channel (horizontal axis). Ideally, no information would be present on the Q-channel. As shown in FIG. 3a, in the case of the LOS signal 48, the receiver rotates the received signal until there is a maximum on the I-channel 52. Thus the receiver locks onto the carrier signal for that particular transmission (received and transmitted carriers aligned in phase).

However, in the case involving one or more multipath signals as shown in FIG. 3b, the receiver may lock onto the vector sum 58 of the LOS and multipath signals 54 and 56. If there is any phase difference between the two signals, the carrier phase that the receiver locks onto will not be the same as either individual carrier phase, but rather, some combination of the two. Generally, there will usually be some complex phase offset between a LOS and multipath signal, and thus the phase of the signal that the receiver has locked onto will be different from the phase of the LOS signal. Accordingly, because the TOA estimation is therefore calculated based on a signal with a different phase than the phase of the LOS signal, the TOA estimate will generally contain some resulting error. The complex phase difference affects TOA estimation accuracy whether the particular modulation scheme makes use of both I and Q channels or only one. Therefore, in the BPSK case shown in FIG. 3b, the effect of the receiver behavior is that neither the LOS nor the multipath signal will appear on the I-channel exactly as they did individually.

Therefore, the standard de-rotation described above that is used in conventional data communication systems is not adequate for time of arrival estimation. In a time of arrival system, the goal is to detect the signal component with the earliest arrival time because this corresponds to the signal that is least affected by multipath. As discussed above, the signal that the receiver locks onto when multipath signals are present may be at a different phase than the LOS component, because the receiver will lock onto the phase of the vector sum of the received LOS and multipath components. This phase offset will result in a different time of arrival estimate. Accordingly, a different de-rotation algorithm is required for accurate time-of-arrival estimation in a multipath environment.

In an exemplary embodiment of a system and method for time of arrival estimation implemented according to the present invention, the earliest significant component in the received signal may be identified. As shown in FIG. 4, the signal of 3b can be phase-shifted until the rotated phase corresponds to the earliest time of arrival. The system and method can be applied to rotate the carrier phase of the received signal numerous times, calculating the TOA at each rotated-phase. The phase rotation which most closely matches the phase of the LOS signal will yield the earliest TOA estimate.

In another exemplary embodiment of a system and method for time of arrival estimation implemented according to the present invention, the enhanced de-rotation algorithm may be implemented by combining the received I and Q signals (real and imaginary data, respectively) into a complex signal and rotating by a chosen phase angle. Since the specific phase angle that will result in earliest time of arrival is unknown, multiple de-rotation phases are applied, and the time of arrival estimations are compared. The earliest time of arrival estimate corresponds to the best estimated earliest TOA of the received signal.

As shown in FIG. 5, because the transmitted data consists purely of BPSK information, the range of de-rotation angles for which time of arrival estimates should be calculated may be limited to a range of less than 360°. For TOA analysis of BPSK signals, any de-rotation angle greater than or equal to 180° is redundant, representing only the negation of a de-rotation angle already calculated in the 0–180° range and not a truly different signal for TOA estimation. In systems that require data processing only on a single channel, rather than the entire complex plane, the range of de-rotation angles searched may be further limited. Since receiver hardware generally operates on the I and Q channels together, the 90° phase difference between the I and Q channels may be exploited. Any I-channel data obtained by de-rotation with an angle in the range 90–180° is equivalent to some Q-channel data obtainable from a de-rotation angle in the range from 0–90°. The Q-channel, if available, can therefore be viewed as providing I-channel information at a different de-rotation angle. Therefore, for a templating procedure that uses only one channel, phases only in a 90° range should be searched.

Generally, because of hardware and time constraints, it will be necessary to quantize the range into a set of angles which is small enough to be reasonably calculable by receiver hardware, yet large enough to be representative of the entire range. This may vary based on numerous factors including cost, hardware resources available, the type of signal being processed, etc.

In one exemplary embodiment of the present invention as implemented to determine the earliest TOA of a BPSK signal, sufficient accuracy may be achieved (in terms of TOA variance and mean accuracy) using only two de-rotation angles. As shown in FIG. 5, de-rotation angles 68 and 74 may be selected. For each of the selected angles, the complex vector may be de-rotated by that angle and then a corresponding TOA calculation may be performed. The earliest TOA of the received signal will correspond to the earlier of the computed TOA estimates.

Rotation of the received signal by each of the selected de-rotation angles of FIG. 5 may provide sufficient resolution and cost-efficiency for this particular exemplary embodiment of the present invention. However, the number of de-rotation samples and TOA calculations can vary depending on the implementation of the present invention. Unlike the common practice of sampling analog signals, where it is assumed that the greatest quantization error will be equal to half the size of the chosen quantization "bin", it is difficult to enumerate the quantization error for de-rotation angles. There is no specific guarantee that a de-rotation angle deviating by a certain amount from the correct angle will result in a specific amount of TOA estimation error. Generally, the computation of more TOA estimates at more de-rotation angles for a received signal should yield less quantization error and more accurate results.

Note that the preceding discussion of the exemplary embodiment of the present invention was presented for the simple two-ray multipath situation. In a more complicated environment, there will be, in general, multiple multipath signals, which a system and method of the present invention may process the same as the exemplary signals discussed above.

Figure 6:
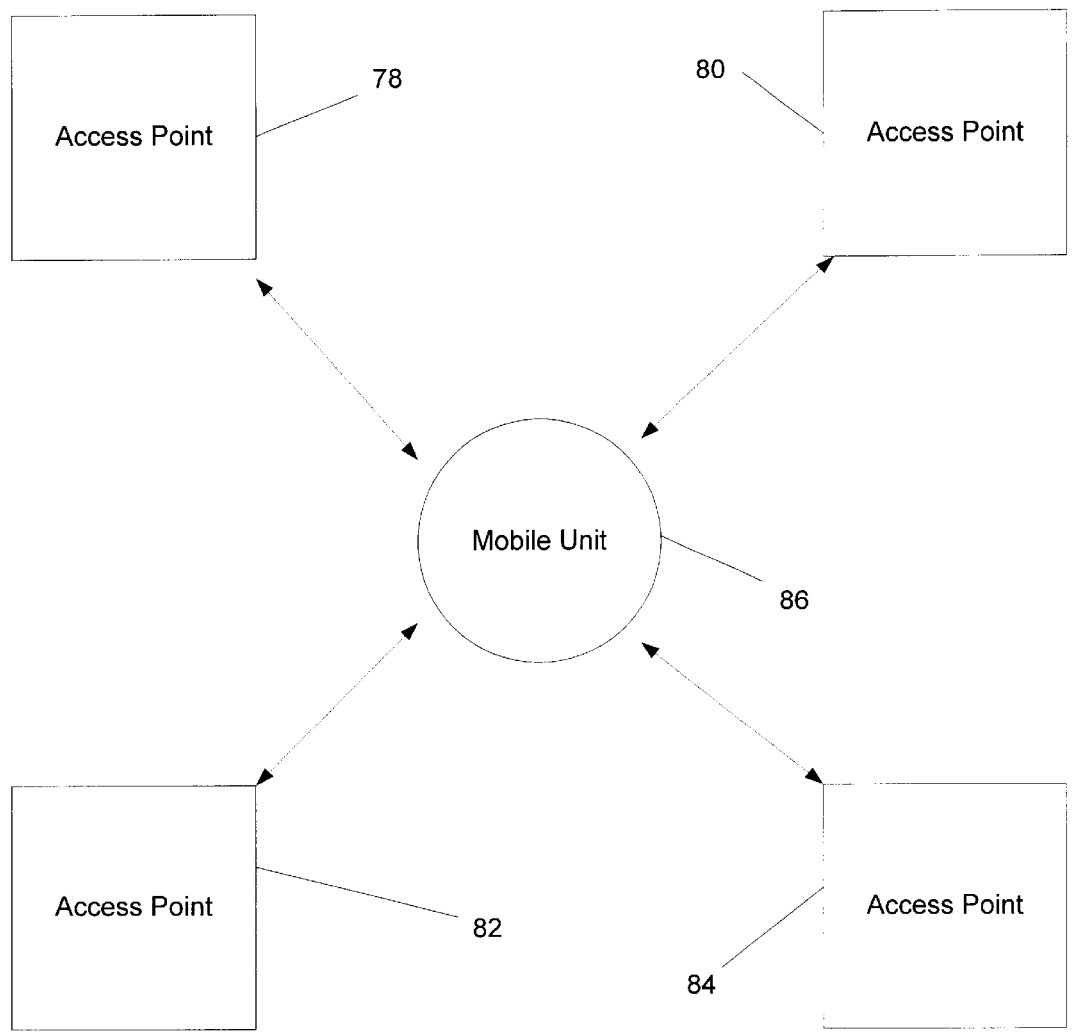
FIG. 6 is a representation of a real time location system which may implement the present invention to locate a transmitter in a particular area.

Referring to FIG. 6, a real-time location system is shown as implemented in an exemplary embodiment of the present invention. Mobile unit 86 communicates with a plurality of wireless access points 78, 80, 82 and 84. While four access points are shown in this exemplary embodiment, a different number of access points may be used. Mobile unit 86 transmits a signal which is received by the access points at different times, depending on the location of mobile unit 86 in the particular area. An earliest time of arrival of the signal at each access point may be computed in order to determine the location of the mobile unit 86 based on the time of arrival of the signal received at the various access points.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims.

What is claimed is:

1. A method for estimating an earliest time of arrival of a received signal in a wireless communication system, comprising the steps of:

forming a complex vector having a first phase reference by combining one or more in-phase components and one or more quadrature components of a signal received on a wireless communication channel;

computing a first time of arrival estimate of the received signal;

computing a derivative complex vector, having a phase reference different from said first phase reference, from said complex vector; and computing at least a second time of arrival estimate of the received signal using said derivative complex vector;

wherein the earliest time of arrival of the received signal is the earliest of the time of arrival estimates.

2. The method of claim 1, further comprising the step of computing a plurality of time of arrival estimates based on a plurality of derivative complex vectors having a plurality of different phase references.

3. The method of claim 2, further comprising the step of comparing the plurality of time of arrival estimates to determine the earliest time of arrival estimate.

4. The method of claim 2, wherein at least one of the different phase references is 45 degrees.

5. The method of claim 2, wherein at least one of the different phase references is 90 degrees.

6. The method of claim 2, wherein at least one of the different phase references is 120 degrees.

7. The method of claim 1, wherein the wireless communication system is an 802.11 compliant system.

8. A logic arrangement for estimating an earliest time of arrival of a received signal in a wireless communication system, which, when executed by a processing arrangement, is operable to perform the steps of:

forming a complex vector having a first phase reference by combining one or more in-phase components and one or more quadrature components of a signal received on a wireless communication channel;

computing a first time of arrival estimate of the received signal;

computing a derivative complex vector, having a phase reference different from said first phase reference, from said complex vector; and computing at least a second time of arrival estimate of the received signal using said derivative complex vector;

wherein the earliest time of arrival of the received signal is the earliest of the time of arrival estimates.

9. The logic arrangement of claim 8, wherein the processing arrangement is further operable to compute a plurality of time of arrival estimates based on a plurality of derivative complex vectors having a plurality of different phase references.

10. The logic arrangement of claim 9, wherein the processing arrangement is further operable to perform the step of comparing the plurality of time of arrival estimates to determine the earliest time of arrival estimate.

11. The logic arrangement of claim 9, wherein at least one of the different phase references is 45 degrees.

12. The logic arrangement of claim 9, wherein at least one of the different phase references is 90 degrees.

13. The logic arrangement of claim 9, wherein at least one of the different phase references is 120 degrees.

14. The logic arrangement of claim 8, wherein the wireless communication system is an 802.11 compliant system.

15. A system for estimating an earliest time of arrival of a received signal in a wireless communication system, comprising:

a processing arrangement operable to execute the following instructions:

form a complex vector having a first phase reference by combining one or more in-phase components and one or more quadrature components of a signal received on a wireless communication channel, compute a first time of arrival estimate of the received signal, compute a derivative complex vector, having a phase reference different from said first phase reference, from said complex vector, and compute at least a second time of arrival estimate of the received signal using derivative complex vector;

wherein the earliest time of arrival of the received signal is the earliest of the time of arrival estimates.

16. The system of claim 15, wherein the processing arrangement is further operable to compute a plurality of time of arrival estimates based on a plurality of derivative complex vectors having a plurality of different phase references.

17. The system of claim 16, wherein the processing arrangement is further operable to perform the step of comparing the plurality of time of arrival estimates to determine the earliest time of arrival estimate.

18. The system of claim 16, wherein at least one of the different phase references is 45 degrees.

19. The system of claim 16, wherein at least one of the different phase references is 90 degrees.

20. The system of claim 16, wherein at least one of the different phase references is 120 degrees.

21. The system of claim 15, wherein the wireless communication system is an 802.11 compliant system.

22. A system for estimating an earliest time of arrival of a received signal in a wireless communication system, comprising:

a wireless receiver for receiving a signal;

at least one A/D converter for converting the received signal into representative digital samples;

at least one combining apparatus configurable to combine one or more in-phase and quadrature components of the received signal into a first complex vector;

at least one phase-shifting apparatus configurable to rotate the phase of the first complex vector to compute at least one derivative complex vector having a phase reference different from the phase reference of the first complex vector;

at least one apparatus for determining at least one estimate of a time of arrival of the received signal based on said at least one derivative complex vector; and at least one comparing apparatus for comparing the at least one estimated time of arrival of the received signal;

wherein the earliest time of arrival of the received signal is the earliest estimated time of arrival.

23. A wireless access point system for use in a wireless communication system, comprising:

a wireless receiver for receiving a signal;

at least one A/D converter for converting the received signal into representative digital samples;

at least one combining apparatus configurable to combine one or more in-phase and quadrature components of the received signal into a first complex vector;

at least one phase-shifting apparatus configurable to rotate the phase of the first complex vector to compute at least one derivative complex vector having a phase reference different from the phase reference of the complex vector;

at least one apparatus for determining at least one estimate of a time of arrival of the received signal based on said at least one derivative complex vector; and at least one comparing apparatus for comparing the at least one estimated time of arrival of the received signal;

wherein the earliest time of arrival of the received signal is the earliest estimated time of arrival.

24. The system of claim 23, wherein the wireless communication system is an 802.11 compliant system.

* * * * *